(12) United States Patent
Filsfils et al.

(10) Patent No.: US 10,469,370 B2
(45) Date of Patent: Nov. 5, 2019

(54) SEGMENT ROUTING TECHNIQUES

(71) Applicant: Cisco Technology, Inc., San Jose, CA (US)

(72) Inventors: Clarence Filsfils, Brussels (BE); Stewart F. Bryant, Redhill (GB); Daniel C. Frost, Middlesex (GB); John W. Evans, Frome (GB)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 15/827,973

(22) Filed: Nov. 30, 2017

(65) Prior Publication Data

US 2018/0083871 A1     Mar. 22, 2018

Related U.S. Application Data

(63) Continuation of application No. 14/047,310, filed on Oct. 7, 2013, now Pat. No. 9,929,946.

(60) Provisional application No. 61/710,121, filed on Oct. 5, 2012.

(51) Int. Cl.
| | | |
|---|---|---|
| *H04L 12/723* | (2013.01) | |
| *H04L 12/721* | (2013.01) | |
| *H04L 12/751* | (2013.01) | |
| *H04L 12/717* | (2013.01) | |
| *H04L 29/06* | (2006.01) | |

(Continued)

(52) U.S. Cl.
CPC .............. *H04L 45/50* (2013.01); *H04L 41/00* (2013.01); *H04L 45/02* (2013.01); *H04L 45/26* (2013.01); *H04L 45/38* (2013.01); *H04L 45/42* (2013.01); *H04L 45/44* (2013.01); *H04L 45/58* (2013.01); *H04L 45/66* (2013.01); *H04L 69/166* (2013.01); *H04L 45/34* (2013.01)

(58) Field of Classification Search
None
See application file for complete search history.

(56) References Cited

U.S. PATENT DOCUMENTS

| | | | |
|---|---|---|---|
| 5,764,624 A | 6/1998 | Endo | 370/218 |
| 6,032,197 A | 2/2000 | Birdwell | 709/216 |
| 6,147,976 A | 11/2000 | Shand | 370/254 |

(Continued)

FOREIGN PATENT DOCUMENTS

| | | |
|---|---|---|
| CA | 101803293 A | 8/2010 |
| CM | 101399688 A | 4/2009 |

(Continued)

OTHER PUBLICATIONS

Bashandy, Ahmed R. et al., "Segment Routing Over Label Distribution Protocol", U.S. Appl. No. 16/367,869, filed Mar. 28, 2019; (37 pages).

(Continued)

*Primary Examiner* — Jeffrey M Rutkowski
*Assistant Examiner* — Andre Tacdiran
(74) *Attorney, Agent, or Firm* — Campbell Stephenson LLP

(57) ABSTRACT

An apparatus and method is disclosed for segment routing (SR). In one embodiment, the method includes a node creating a segment stack that identifies one segment calculated using a first algorithm and a second segment calculated using a second, different algorithm. The node then attaches this header to a packet and sends it to another node.

14 Claims, 7 Drawing Sheets

(51) Int. Cl.
*H04L 12/24* (2006.01)
*H04L 12/775* (2013.01)

(56) References Cited

U.S. PATENT DOCUMENTS

| | | | |
|---|---|---|---|
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.5 |
| 7,068,654 B1 | 6/2006 | Joseph et al. | 370/392 |
| 7,072,346 B2 | 7/2006 | Hama | 370/395.5 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/254 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.5 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,568,047 B1* | 7/2009 | Aysan | H04L 45/02 370/352 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,903,554 B1* | 3/2011 | Manur | H04L 45/026 370/230.1 |
| 7,940,695 B1 | 5/2011 | Bahadur et al. | 370/254 |
| 7,983,174 B1 | 7/2011 | Monaghan et al. | 370/242 |
| 8,064,441 B2 | 11/2011 | Wijnands et al. | 370/389 |
| 8,121,126 B1* | 2/2012 | Moisand | H04L 45/50 370/392 |
| 8,339,973 B1 | 12/2012 | Pichumani et al. | 370/248 |
| 8,422,514 B1 | 4/2013 | Kothari et al. | 370/466 |
| 8,542,706 B2 | 9/2013 | Wang et al. | 370/474 |
| 8,611,335 B1* | 12/2013 | Wu | H04L 47/41 370/351 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,848,728 B1 | 9/2014 | Revah | 370/386 |
| 8,923,292 B2 | 12/2014 | Friskney | 370/392 |
| 8,953,590 B1 | 2/2015 | Aggarwal | 370/389 |
| 9,036,474 B2 | 5/2015 | Dibirdi et al. | 370/235 |
| 9,049,233 B2 | 6/2015 | Frost et al. | |
| 9,094,337 B2 | 7/2015 | Bragg | |
| 9,112,734 B2 | 8/2015 | Edwards et al. | |
| 9,118,572 B2 | 8/2015 | Sajassi | |
| 9,319,312 B2 | 4/2016 | Filsfils et al. | 709/223 |
| 9,485,150 B2* | 11/2016 | Filsfils | H04L 41/12 |
| 9,571,349 B2 | 2/2017 | Previdi et al. | |
| 9,660,897 B1 | 5/2017 | Gredler | |
| 9,749,227 B2 | 8/2017 | Frost et al. | |
| 2001/0037401 A1 | 11/2001 | Soumiya | 709/232 |
| 2001/0055311 A1 | 12/2001 | Trachewsky | 370/445 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0133412 A1 | 7/2003 | Iyer | 370/235 |
| 2003/0142674 A1 | 7/2003 | Casey | 370/393 |
| 2003/0142685 A1 | 7/2003 | Bare | 370/410 |
| 2003/0231634 A1 | 12/2003 | Henderson | 370/395.3 |
| 2004/0160958 A1 | 8/2004 | Oh | 370/395.1 |
| 2004/0174879 A1 | 9/2004 | Basso et al. | 370/392 |
| 2004/0190527 A1 | 9/2004 | Okura | 370/392 |
| 2004/0196840 A1 | 10/2004 | Amrutur et al. | 370/389 |
| 2004/0202158 A1 | 10/2004 | Takeno | 379/389 |
| 2004/0240442 A1 | 12/2004 | Grimminger | 370/389 |
| 2005/0073958 A1 | 4/2005 | Atlas | 370/238 |
| 2005/0105515 A1 | 5/2005 | Reed | 370/360 |
| 2005/0157724 A1 | 7/2005 | Montuno | 370/392 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0146696 A1 | 7/2006 | Li | 370/218 |
| 2006/0187817 A1 | 8/2006 | Charzinski | 370/216 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0041345 A1* | 2/2007 | Yarvis | H04L 45/00 370/331 |
| 2007/0053342 A1 | 3/2007 | Siereki | 370/351 |
| 2007/0058638 A1 | 3/2007 | Guichard et al. | 370/395.3 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0049610 A1 | 2/2008 | Linwong | 370/225 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Goode | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.5 |
| 2008/0212465 A1 | 9/2008 | Yan | 370/225 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2008/0316916 A1 | 12/2008 | Tazzari | 370/216 |
| 2009/0041038 A1 | 2/2009 | Martini et al. | 370/401 |
| 2009/0049194 A1 | 2/2009 | Csaszar | 709/242 |
| 2009/0067348 A1 | 3/2009 | Vasseur | 370/256 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0196289 A1 | 8/2009 | Shankar | 370/392 |
| 2009/0247157 A1 | 10/2009 | Yoon | 455/434 |
| 2009/0296710 A1 | 12/2009 | Agrawal | 370/392 |
| 2010/0063983 A1 | 3/2010 | Groarke et al. | 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0272110 A1 | 10/2010 | Allan et al. | 370/395.5 |
| 2010/0284309 A1 | 11/2010 | Allan et al. | 370/256 |
| 2010/0329153 A1* | 12/2010 | Xu | H04L 41/082 370/254 |
| 2011/0021193 A1* | 1/2011 | Hong | H04B 7/155 455/435.1 |
| 2011/0060844 A1 | 3/2011 | Allan et al. | 709/241 |
| 2011/0063986 A1 | 3/2011 | Denecheau | 370/248 |
| 2011/0090913 A1 | 4/2011 | Kim | 370/400 |
| 2011/0149973 A1 | 6/2011 | Esteve Rothenberg | 370/392 |
| 2011/0228780 A1 | 9/2011 | Ashwood-Smith | 370/392 |
| 2011/0261722 A1 | 10/2011 | Awano | 370/254 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |

(56) References Cited

U.S. PATENT DOCUMENTS

| | | | | |
|---|---|---|---|---|
| 2012/0063526 A1 | 3/2012 | Xiao | | 375/259 |
| 2012/0069740 A1 | 3/2012 | Lu et al. | | 370/238 |
| 2012/0069845 A1 | 3/2012 | Carney et al. | | 370/392 |
| 2012/0075988 A1 | 3/2012 | Lu | | 370/218 |
| 2012/0082034 A1 | 4/2012 | Vasseur | | 370/235 |
| 2012/0099861 A1 | 4/2012 | Zheng | | 398/45 |
| 2012/0106560 A1 | 5/2012 | Gumaste | | 370/401 |
| 2012/0120808 A1* | 5/2012 | Nandagopal | | H04L 45/025 370/238 |
| 2012/0170461 A1 | 7/2012 | Long | | 370/235 |
| 2012/0179796 A1 | 7/2012 | Nagaraj | | 709/223 |
| 2012/0213225 A1 | 8/2012 | Subramanian et al. | | 370/392 |
| 2012/0218884 A1 | 8/2012 | Kini | | 370/228 |
| 2012/0236860 A1 | 9/2012 | Kompella et al. | | 370/392 |
| 2012/0243539 A1 | 9/2012 | Keesara | | 370/392 |
| 2012/0287818 A1 | 11/2012 | Corti et al. | | 370/254 |
| 2012/0307629 A1 | 12/2012 | Vasseur | | 370/228 |
| 2013/0003728 A1 | 1/2013 | Kwong et al. | | 370/389 |
| 2013/0051237 A1 | 2/2013 | Ong | | 370/237 |
| 2013/0077476 A1 | 3/2013 | Enyedi | | 370/225 |
| 2013/0077624 A1 | 3/2013 | Keesara et al. | | 370/390 |
| 2013/0077625 A1 | 3/2013 | Khera | | 370/390 |
| 2013/0077626 A1 | 3/2013 | Keesara et al. | | 370/390 |
| 2013/0114402 A1 | 5/2013 | Ould-Brahim | | 370/225 |
| 2013/0142052 A1 | 6/2013 | Burbidge | | 370/242 |
| 2013/0188634 A1 | 7/2013 | Magee | | 370/389 |
| 2013/0219034 A1 | 8/2013 | Wang et al. | | 709/222 |
| 2013/0258842 A1 | 10/2013 | Mizutani | | 370/228 |
| 2013/0266012 A1 | 10/2013 | Dutta et al. | | 370/392 |
| 2013/0266013 A1 | 10/2013 | Dutta et al. | | 370/392 |
| 2013/0308948 A1 | 11/2013 | Swinkels | | 398/66 |
| 2013/0322449 A1* | 12/2013 | Hwang | | H04L 45/50 370/392 |
| 2013/0343204 A1 | 12/2013 | Geib et al. | | 370/248 |
| 2014/0044036 A1* | 2/2014 | Kim | | H04W 72/0446 370/315 |
| 2014/0160925 A1 | 6/2014 | Xu | | 370/235 |
| 2014/0169370 A1 | 6/2014 | Filsfils et al. | | 370/392 |
| 2014/0177638 A1 | 6/2014 | Bragg et al. | | 370/395.3 |
| 2014/0189156 A1 | 7/2014 | Morris | | 709/238 |
| 2014/0192677 A1 | 7/2014 | Chew | | 370/254 |
| 2014/0254596 A1 | 9/2014 | Filsfils et al. | | 370/392 |
| 2014/0269266 A1 | 9/2014 | Filsfils et al. | | 370/228 |
| 2014/0269421 A1 | 9/2014 | Previdi et al. | | 370/254 |
| 2014/0269422 A1 | 9/2014 | Filsfils et al. | | 370/254 |
| 2014/0269698 A1 | 9/2014 | Filsfils et al. | | 370/389 |
| 2014/0269699 A1 | 9/2014 | Filsfils et al. | | 370/389 |
| 2014/0269721 A1 | 9/2014 | Bashandy et al. | | 370/392 |
| 2014/0269725 A1 | 9/2014 | Filsfils et al. | | 370/392 |
| 2014/0269727 A1 | 9/2014 | Filsfils et al. | | 370/392 |
| 2014/0286195 A1 | 9/2014 | Fedyk | | 370/254 |
| 2014/0317259 A1 | 10/2014 | Previdi et al. | | 709/223 |
| 2014/0369356 A1 | 12/2014 | Bryant et al. | | 370/392 |
| 2015/0023328 A1 | 1/2015 | Thubert et al. | | 370/336 |
| 2015/0030020 A1 | 1/2015 | Kini | | 370/389 |
| 2015/0109902 A1 | 4/2015 | Kumar | | 370/219 |
| 2015/0249587 A1 | 9/2015 | Kozat | | 370/222 |
| 2015/0256456 A1 | 9/2015 | Previdi et al. | | 370/392 |
| 2015/0263940 A1 | 9/2015 | Kini | | 370/236.2 |
| 2015/0326675 A1 | 11/2015 | Kini | | 709/224 |
| 2015/0334006 A1 | 11/2015 | Shao | | 370/225 |
| 2015/0381406 A1 | 12/2015 | Francois | | 370/218 |
| 2016/0006614 A1 | 1/2016 | Zhao | | 370/254 |
| 2016/0021000 A1 | 1/2016 | Previdi et al. | | 370/389 |
| 2016/0034209 A1 | 2/2016 | Nanduri | | 711/114 |
| 2016/0034370 A1 | 2/2016 | Nanduri | | 714/6.22 |
| 2016/0119159 A1 | 4/2016 | Zhao | | 370/390 |
| 2016/0127142 A1 | 5/2016 | Tian | | 370/390 |
| 2016/0173366 A1 | 6/2016 | Saad | | 370/218 |
| 2016/0191372 A1 | 6/2016 | Zhang | | 370/390 |
| 2016/0254987 A1 | 9/2016 | Eckert et al. | | 370/390 |
| 2016/0254988 A1 | 9/2016 | Eckert et al. | | 370/390 |
| 2016/0254991 A1 | 9/2016 | Eckert et al. | | 370/225 |
| 2016/0352654 A1 | 12/2016 | Filsfils et al. | | 370/392 |
| 2017/0019330 A1 | 1/2017 | Filsfils et al. | | 370/389 |
| 2017/0104673 A1 | 4/2017 | Bashandy et al. | | 370/392 |
| 2017/0111277 A1 | 4/2017 | Previdi et al. | | 370/392 |
| 2017/0302561 A1 | 10/2017 | Filsfils et al. | | 370/389 |
| 2017/0302571 A1 | 10/2017 | Frost et al. | | 370/254 |
| 2017/0346718 A1 | 11/2017 | Psenak et al. | | 370/235 |
| 2017/0346737 A1 | 11/2017 | Previdi et al. | | 370/392 |
| 2017/0366453 A1 | 12/2017 | Previdi et al. | | 370/392 |
| 2018/0077051 A1 | 3/2018 | Nainar | | 370/228 |
| 2018/0083871 A1 | 3/2018 | Filsfils | | 370/392 |
| 2018/0131532 A1 | 5/2018 | Wijnands | | |
| 2019/0097925 A1 | 3/2019 | Previdi et al. | | H04L 12/723 |

FOREIGN PATENT DOCUMENTS

| | | |
|---|---|---|
| CN | 1726679 A | 1/2006 |
| CN | 101247253 A | 8/2008 |
| CN | 101496357 A | 7/2009 |
| CN | 101616466 A | 12/2009 |
| CN | 101841442 A | 9/2010 |
| CN | 101931548 A | 12/2010 |
| CN | 102098222 A | 6/2011 |
| CN | 102132533 A | 7/2011 |
| CN | 102299852 A | 12/2011 |
| CN | 102498694 A | 6/2012 |
| CN | 102714625 A | 10/2012 |
| WO | WO 2008/021195 A1 | 2/2008 |
| WO | WO 2008021195 A1 * | 2/2008 |

OTHER PUBLICATIONS

Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.

Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.

Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.

Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.

Akiya, N. et al., "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.

Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.

Akiya, N., "Segment Routing Implications on BFD"; Sep. 9, 2013; 3 pages.

Alcatel-Lucent, "Segment Routing and Path Computation Element—Using Traffic Engineering to Optimize Path Placement and Efficiency in IP/MPLS Networks"; Technology White Paper; 2015; 28 pages.

Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.

Awduche, Daniel O., et al., "RSVP-TE: Extensions to RSVP for LSP Tunnels," Network Working Group, Internet-Draft, Aug. 2000, pp. 1-12.

Awduche, Daniel O., et al., "RSVP-TE: Extensions to RSVP for LSP Tunnels," Network Working Group, Request for Comments 3209, Dec. 2001, pp. 1-61.

Awduche, D. et al., "Requirements for Traffic Engineering Over MPLS"; Network Working Group; Request for Comments: 2702; Sep. 1999; pp. 1-29.

(56) References Cited

OTHER PUBLICATIONS

Awduche, D. et al., "Overview and Principles of Internet Traffic Engineering"; Network Working Group; Request for Comments: 3272; May 2002; pp. 1-71.
Backes, P. and Rudiger Geib, "Deutsche Telekom AG's Statement About IPR Related to Draft-Geig-Spring-OAM-Usecase-01," Feb. 5, 2014, pp. 1-2.
Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
Cisco Systems, Inc., "Introduction to Intermediate System-to-Intermediate System Protocol," published 1992-2002; pp. 1-25.
Crabbe, E. et al., "PCEP Extensions for MPLS-TE LSP Protection with Stateful PCE Draft-Crabbe-PCE-Stateful-PCT-Protection-00," Network Working Group, Internet-Draft, Apr. 2013, pp. 1-12.
Crabbe, E., et al., Stateful PCE Extensions for MPLS-TE LSPs, draft-crabbe-pce-stateful-pce-mpls-te-00; Network Working Group, Internet- Draft, Oct. 15, 2012, pp. 1-15.
Deering, S., et al., Cisco, Internet Protocol, Version 6 (IPv6) Specification, Network Working Group, Request for Comments 2460, Dec. 1998, pp. 1-39.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Farrel, A., et al., Old Dog Consulting, A Path Computation Element (PCE)-Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol-Traffic Enginering (RSVP-TE) Extensions, Network Working Group, Request for Comments 5151, Feb. 2008, pp. 1-25.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013; pp. 1-28.
Filsfils, C., et al., Cisco Sytems, Inc., "Segment Routing Architecture"; draft-filsfils-rtgwg-segment-routing-01, Network Working Group, Internet-Draft, Oct. 21, 2013, pp. 1-28.
Filsfils, C. et al., Cisco Systems, Inc., "Segment Routing Interoperability with LDP"; draft-filsfils-spring-segment-routing-ldp-interop-01.txt; Apr. 18, 2014, pp. 1-16.
Filsfils, C. et al., "Segment Routing Architecture"; draft-ietf-spring-segment-routing-07; Network Working Group, Internet-Draft; Dec. 15, 2015; pp. 1-24.
Filsfils, C. et al.; "Segment Routing Use Cases"; draft-filsfils-rtgwg-segment-routing-use-cases-01; Network Working Group; Internet-Draft; Jul. 14, 2013; pp. 1-46.
Filsfils, C. et al., "Segment Routing Use Cases", draft-filsfils-rtgwg-segment-routing-use-cases-02; Network Working Group; Internet-Draft; Oct. 21, 2013; pp. 1-36.
Filsfils, C. et al., "Segment Routing with MPLS Data Plane", draft-ietf-spring-segment-routing-mpls-05; Network Working Group; Internet-Draft; Jul. 6, 2016; 15 pages.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.

Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case," IETF 87, Berlin, Jul./Aug. 2013, pp. 1-3.
Geib, R., Deutsch Telekom, "Use Case for a Scalable and Topology Aware MPLS data plan monitoring System," draft-geib-spring-oam-usecase-00; Internet-Draft, Oct. 17, 2013, pp. 1-7.
Geib, R., Deutsch Telekom, "Use Case for a Scalable and Topology Aware MPLS Data Plan Monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google—Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 196-201.
Kompella, K. et al, Juniper Networks, "Label Switched Paths (LSP) Hierarchy with Generalized Multi-Protocol Label Switching (GMPLS) Traffic Engineering (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks, "Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00; Network Work Group; Internet-Draft; Jan. 2, 2014, pp. 1-15.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane," draft-ietf-mpls-spring-lsp-ping-00; Network Work Group; Internet Draft; May 10, 2016; 17 pages.
Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.
Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.

* cited by examiner

| Segment ID | Egress Int | Stack Ins |
|---|---|---|
| 9001 | 1 | Inc |
| 9002 | 2 | Inc |
| 9003 | 3 | Inc |
| 64 | 1 | Cont |
| 65 | 1 | Cont |
| 66 | — | Inc |
| 67 | 2 | Cont |
| 68 | 1 | Cont |
| 69 | 3 | Cont |
| 70 | 3 | Cont |
| 71 | 3 | Cont |
| 72 | 2 | Cont |
| 5001 | — | Inc |

SEGMENT ROUTING TECHNIQUES

CROSS-REFERENCE TO RELATED APPLICATIONS

The present patent application is a continuation of and is related to U.S. patent application Ser. No. 14/047,310, filed on Oct. 7, 2013 entitled "Segment Routing Techniques," which claims the domestic benefit under Title 35 of the United States Code § 119(e) of U.S. Provisional Patent Application Ser. No. 61/710,121 entitled "Methods for Using Chain Routing," filed Oct. 5, 2012. Both are hereby incorporated by reference in their entirety and for all purposes as if completely and fully set forth herein.

BACKGROUND

Packet forwarding is a process of relaying packets from one communication link to another by nodes in a network. A packet is a formatted unit of data that typically contains control information and payload data. Control information may include: source and destination IP addresses, error detection codes like checksums, sequencing information, etc. Control information is typically found in packet headers and trailers, with payload data in between.

At network nodes where multiple outgoing links are available, the choice of link to use for packet forwarding requires a decision process that, while simple in concept, can be complex. Since packet forwarding decisions are handled by nodes, the total time required for this can become a major limiting factor in overall network performance.

Label Distribution Protocol (LDP) is a mechanism where network nodes (e.g., routers) capable of Multiprotocol Label Switching (MPLS) exchange labels with their neighbors. These labels can be subsequently attached to packets and used by nodes to make packet forwarding decisions. For purposes of explanation only, nodes that make packet forwarding decisions based on labels will be referred to as LDP nodes. Packet forwarding based on labels stands in stark contrast to traditional Internet Protocol (IP) routing in which packet forwarding decisions are made using IP addresses contained within packets. Because LDP nodes use labels, there is no need for LDP nodes to examine the contents (e.g., IP addresses) of packets to make packet forwarding decisions.

BRIEF DESCRIPTION OF THE DRAWINGS

The present disclosure may be better understood, and its numerous objects, features, and advantages made apparent to those skilled in the art by referencing the accompanying drawings.

FIG. 2B is graphical representation of an example forwarding table stored in a node, according to one embodiment.

DETAILED DESCRIPTION

Overview

Figure 1A:
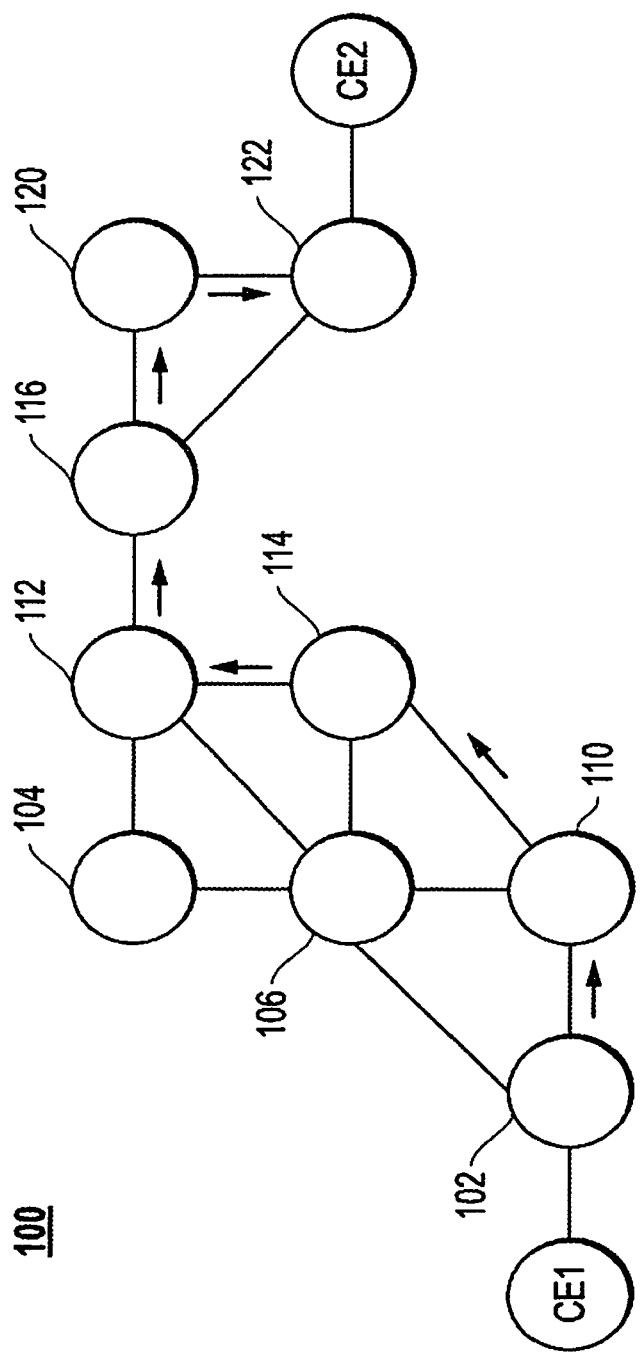
FIG. 1A is a block diagram illustrating an example network, according to one embodiment.

An apparatus and method is disclosed for segment routing (SR). In one embodiment, the method includes a node creating a segment stack that identifies one segment calculated using a first algorithm and a second segment calculated using a second, different algorithm. The node then attaches this header to a packet and sends it to another node.

IP routing and Multiprotocol Label Switching (MPLS) are distinct packet forwarding mechanisms. IP routing uses IP addresses inside packet headers to make forwarding decisions. In contrast, LDP nodes (i.e., nodes employing MPLS) can make forwarding decisions using short path identifiers called labels that are attached to packets. Segment routing (SR) is yet another mechanism that can be employed. SR is similar to MPLS in many regards. For example, forwarding decisions in SR can be based on short path identifiers called segment IDs that are attached to packets. However, substantial differences exist between SR and MPLS as will be more fully described below.

IP Routing

IP routing uses routing tables that maintain forwarding information to various destinations. In one embodiment, when a packet arrives at a node, the node can use the destination IP address in the packet header to access a routing table and lookup corresponding forwarding information such as an egress interface, which is the interface or port to be used to forward the packet to the next node on a path to the packet's final destination. After the packet is forwarded the next node performs its own routing table lookup using the same destination IP address, and so on.

MPLS

MPLS is commonly employed in provider networks or networks that provide packet transport and other services for customers. Packets enter an MPLS provider network via an ingress provider edge (PE) node, travel hop-by-hop along a label-switched path (LSP) that includes one or more core nodes, and exit the provider network via an egress PE node.

Packets are forwarded along an LSP based on LDP forwarding tables and labels attached to packets. Labels allow for the use of very fast and simple forwarding engines in the dataplane of LDP nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the provider network. LSPs can be established for a variety of purposes, such as to guarantee a certain level of performance when transmitting packets, to forward packets around network congestion, to create IP tunnels for network-based virtual private networks, etc. In many ways, LSPs are no different than circuit-switched paths in ATM or Frame Relay networks, except that they are not dependent on a particular Layer 2 technology.

LDP is employed in the control plane of LDP nodes. Two nodes, called LDP peers, exchange label mapping information on a FEC by FEC basis. The exchange of information can be bi-directional. LDP generates labels for, and exchanges labels between, peer nodes. LDP can be used to build and maintain LDP forwarding tables that map labels and node interfaces. These forwarding tables can be subsequently used by nodes to forward packets through MPLS networks as more fully described below.

When a packet is received by an ingress PE node of an MPLS network, the ingress PE node may determine a corresponding FEC. Characteristics for determining the FEC for a packet can vary, but typically the determination is based on the packet's destination IP address. Quality of Service for the packet may also be used to determine the FEC. Once determined, the ingress PE node can access a table to select a label that is mapped to the FEC. The table may also map an egress interface to the FEC. Before the ingress PE node forwards the packet via the egress interface, the ingress PE node pushes or attaches the label to the packet.

A packet with attached label can be forwarded along an LSP, and nodes in the LSP can make forwarding decisions based on labels. To illustrate, when an LDP node receives a packet with an attached label (i.e., incoming label), an LDP forwarding table in the node can be accessed to read an egress interface and a label (i.e., an outgoing label) mapped to the incoming label. Before the packet is forwarded via the egress interface, the node may swap the incoming label with the outgoing label. The next hop receives the packet and attached label and may perform the same process. This process is often called hop-by-hop forwarding along a non-explicit path. The egress PE node in the LSP may pop or remove an incoming label before the packet is forwarded to a customer. To illustrate, FIG. 1A shows a portion of an example MPLS provider network 100 that includes LDP nodes 102-122 coupled together via communication links. An LSP from node 102 to node 122 can be created so that all packets of a stream associated with a particular FEC sent from node 102 to node 122 can travel forward through the same set of LDP nodes. Each node maintains information for the LSP established through it in an LDP forwarding table. If node 110 knows that node 114 is the next hop along the LSP for all packets received from node 102 that are destined for node 122, node 110 can forward the packets to node 114.

Segment Routing

Segment routing (SR), which can also be referred to as chain routing (CR), is a mechanism in which packets can be forwarded using SR forwarding tables and segment IDs attached to packets. Like MPLS, SR enables very fast and simple forwarding engines in the dataplane of nodes. SR is not dependent on a particular Open Systems Interconnection (OSI) model data link layer technology to forward packets.

SR nodes (i.e., nodes employing SR) are similar to LDP nodes in many ways. Since most SR nodes make forwarding decisions based on segment IDs as opposed to labels, however, SR nodes need not employ LDP in their control planes. Unless otherwise indicated, an SR node lacks LDP in the control plane. Additional differences can exist between SR nodes and LDP nodes.

SR can be employed in provider networks. Packets enter an SR enabled provider network via an ingress provider edge (PE) node, travel hop-by-hop along a segment-switched path (SSP) that includes one or more core nodes, and exit the provider network via an egress PE node. Much of the remaining disclosure will make reference to an autonomous, provider network that operates under one administrative domain, although SR can be employed over multiple administrative domains as well. In general a provider network may contain a contiguous set of nodes.

Like labels, segment IDs are short (relative to an IP address or a FEC), fixed-length identifiers. Segment IDs may correspond to topological segments of a provider network or services provided by nodes thereof. Topological segments can be one hop paths to SR nodes, or they can be multi-hop paths to SR nodes. Topological segments act as sub-paths that can be combined to form an SSP. Stacks of segment IDs can represent SSPs, as will be described below. Like LSPs, SSPs can be associated with FECs. Thus segment ID stacks may correspond to FECs.

There are several types of segment IDs, including but not limited to: nodal-segment IDs, adjacency-segment IDs, and service-segment IDs. A nodal-segment ID represents a one-hop or a multi-hop path within the provider network to an associated SR node. Nodal-segment IDs are assigned to respective SR nodes within the provider network so that no two SR nodes in the provider network are assigned the same nodal-segment ID. In one embodiment, all assigned nodal-segment IDs are selected from a predefined ID range (e.g., [64, 5000]) for the provider network. The range for nodal-segment IDs may be different from a predefined range for labels.

Nodal-segment IDs can be assigned to SR nodes, in some embodiments, by a path computation element (PCE) server. When an SR node is powered on, the SR node can send a query to the PCE server requesting a nodal-segment ID. In response, the PCE server can respond with an appropriate identifier from the predefined ID range. The PCE server can maintain a record (e.g., in a data structure in memory, in a file on a hard drive, and the like) that indicates which nodes have been assigned nodal-segment IDs. If the requesting SR node has not already been assigned a nodal-segment ID, the PCE server can select an unused ID from the ID range, send a response containing the selected ID, and update the record to show that the requesting node has been assigned the selected ID. If the requesting SR node has already been assigned a nodal-segment ID (e.g., before being powered down), the PCE server can access the record to obtain the already-assigned nodal-segment ID and return that ID to the requesting SR node.

Instead of sending IDs in response to requests from SR nodes, the PCE server can alternatively identify that a newly-booted SR node needs a nodal-segment ID and assign (and send) that SR node a nodal-segment ID without having first received a request from that SR node. Similarly, a PCE server can identify that an SR node that already has one or more assigned nodal-segment IDs needs a new nodal-segment ID (in order to provide an alternative path to that SR node) and can thus similarly assign and send the SR node its additional nodal-segment ID.

In addition to providing nodal-segment IDs, the PCE server may, in some embodiments, also specify the type of algorithm to be used when calculating the path identified by that nodal-segment ID. In such embodiments, the SR nodes do not need to be preconfigured with the identity of the particular type of algorithm(s) to use in nodal-segment path calculation.

The SR nodes can map their respectively assigned nodal-segment IDs in memory to unique identifiers. For purposes of explanation only, nodal-segment IDs are mapped to respective node loopback prefix IP addresses. One of ordinary skill understands that node loopback prefix IP addresses (node prefixes for short) distinguish the SR nodes from each other within the provider network. The node prefixes can be used by link state protocols such as open shortest path first (OSPF) or intermediate system to intermediate system (IS-IS), or modifications thereof, operating in the control plane of an SR node to identify egress interfaces for paths to respective SR nodes. Once identified, the appropriate egress interfaces for the paths can be mapped to nodal-segment IDs within an SR forwarding table as the SR forwarding table is created or subsequently updated.

In some embodiments, the link state protocols can calculate paths to SR nodes using a variety of different algorithms. A default path-calculation algorithm (e.g., a Dijkstra shortest path rooted at the SR node to which the path leads) may be used if no specific algorithm is specified; if an algorithm is specified for a particular path, however, all SR nodes will use the same specific algorithm when calculating that path. As described above, each SR node uses the path calculation in order to identify the appropriate egress interface to add to its SR forwarding table for a given nodal-segment ID.

Examples of the different algorithms that can be used to calculate a path to an SR node include Dijkstra algorithms rooted at that SR node that have one or more of the following characteristics: use of an IGP metric; use of an IGP extended latency metric; bounds on a cumulative metric; exclusion of links with loss larger than a threshold; exclusion or inclusion of a set of one or more shared risk link groups (SRLGs); use of a set of affinities; and the like. In general, the algorithms that can be used can include those used to calculate the shortest-path on any metric (not only that used by IS-IS metric), those with bounds on metrics, those having non-cumulative metrics (e.g., such as those handling optical non-linear impairments), those used to calculate non-shortest paths (e.g. reverse-Dijkstra algorithms), those enforcing disjointness based on SRLG and/or affinity, those enforcing inclusion based on SRLG and/or affinity, and the like. Thus, a node could advertise its nodal-segment ID along with a flag indicating that the algorithm used to compute the path associated with that nodal-segment ID is a Dijkstra rooted at the node on metric m2 with a bound on latency and exclusion of links with loss larger than a threshold and exclusion of SRLG 23.

In some embodiments, it may be desirable, from a traffic engineering standpoint, for there to be two (or more) different nodal segments leading to the same SR node. In such embodiments, that SR node can be assigned two different nodal-segment IDs (e.g., each of which can then be mapped to a different node prefix). In these situations, the distinct paths are each calculated using a different algorithm. Accordingly, another node can include multiple nodal-segment IDs for segments leading to the same SR node in its SR forwarding table (e.g., like SR forwarding table 240 in FIG. 2A), but each of these nodal-segment IDs may be associated with a different egress interface, which is identified using the specific algorithm used to calculate the respective nodal-segment identified by each nodal-segment ID.

One example of a situation in which it is desirable to have multiple nodal-segments leading to the same SR node involves traffic between two continents. There may be two different undersea cables available to carry this traffic. As such, one nodal-segment can be defined for a path using the first undersea cable (e.g., for standard customers' traffic) and another nodal-segment can be defined for the path using the second undersea cable (e.g., for premium customers' traffic). The first path can be computed using an IS-IS shortest path algorithm while the second can be computed using an algorithm that takes a latency metric into account.

Multiple nodal-segments leading to the same SR node can also be implemented for customers who desire to have multiple disjoint (non-overlapping) paths between customer locations. Here, algorithms that use different exclusion constraints can be used to calculate those disjoint paths.

An adjacency-segment ID represents a link between adjacent SR nodes. For purposes of explanation only, this disclosure will refer to a link between nodes as an adjacency segment (hereafter adjacency). Adjacencies can be uniquely identified in the provider network. For purposes of explanation only, this disclosure will identify an adjacency (hereafter adjacency-ID) using the node prefixes of nodes between which the adjacency is immediately positioned. To illustrate, for an adjacency between two nodes identified by node prefix X and node prefix Y, the adjacency will be identified herein as adjacency-ID XY. This disclosure will presume that only one adjacency exists between nodes in the provider network, it being understood the present disclosure should not be limited thereto. As such, adjacencies are unique in the provider network of this disclosure. Since adjacencies are unique, it follows that adjacency-IDs are likewise unique. Adjacency-IDs should not be confused with adjacency-segment IDs; adjacency-segment IDs may not be unique within the provider network domain.

Each SR node can assign a distinct adjacency-segment ID for each of the SR node's adjacencies. Separate SR nodes may assign the same adjacency-segment ID. Adjacency-segment IDs, however, are locally significant; separate SR nodes may assign the same adjacency-segment ID, but that adjacency-segment ID represents distinct adjacencies. In one embodiment, adjacency-segment IDs are selected from a predefined range that is outside the predefined range for nodal-segment IDs. The predefined range of adjacency-segment IDs may also be outside the predefined range for labels.

Service-segment IDs correspond to packet services performed by SR nodes such as deep packet inspection (DPI) and/or filtering. Each SR node can assign a distinct service-segment ID for each of the SR node's packet services. For the purposes of explanation only, a node will offer no more than one service. Service-segment IDs are locally significant Like adjacency-IDs, separate SR nodes may assign the same service-segment ID for their respective services. Service-segment IDs can be selected from the same range as the adjacency-segment IDs, or service-segment IDs can selected from a predefined range that is distinct from the ranges for labels, adjacency-segment IDs and/or nodal-segment IDs. The service-segment IDs can be assigned based on service type, it being understood the present disclosure should not be limited thereto. As an example, adjacency-segment ID 5001 is always mapped to deep packet inspection within the provider network, regardless of the node or nodes that perform the service.

SR nodes can advertise their nodal-segment IDs, adjacency-segment IDs, service-segment IDs, and node prefixes to other SR nodes in the provider network using a protocol such as interior gateway protocol (IGP) or a modification thereof. SR nodes can use the nodal-segment IDs, adjacency-segment IDs, service-segment IDs, node prefixes, and/or other information to create or update SR forwarding tables and/or segment ID stacks.

In one embodiment the SR nodes can advertise their nodal-segment ID/node prefix pairs, adjacency-segment ID/adjacency-ID pairs, and/or service-segment ID/node prefix pairs. The control planes of an SR node can receive and use the nodal-segment ID/node prefix pairs and a link-state protocol such as IS-IS or OSPF, or modified versions thereof, to identify egress interfaces for paths to SR nodes, using the appropriate algorithms identified (if any) in the advertisements of the nodal-segment to those SR nodes or a default algorithm (e.g., a Dijkstra shortest path rooted at the appropriate SR node). An egress interface, once identified, can be mapped to its respective nodal-segment ID in the node's SR forwarding table.

Nodes also map their adjacency-segment IDs to egress interfaces for respective adjacencies in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID/adjacency-ID pair should be the only node in the provider network that has a SR forwarding table that maps the adjacency-segment ID to an egress interface connected to an adjacency identified by the adjacency-ID. Service-segment IDs are also locally significant and should only be mapped in the nodes in which they are advertised. Unlike adjacency-segment IDs, however, service-segment IDs are not mapped to egress interfaces. Rather, the service-segment IDs are mapped to respective services that can be implemented by the node.

In one embodiment, SR nodes can use a sub-type-length-value (sub-TLV) in an IS-IS protocol link state packet to advertise IDs. This sub-TLV can include information identifying the ID being advertised, as well as the type of that ID (e.g., nodal-segment ID, adjacency-segment ID, or service-segment ID). The sub-TLV can also include information (e.g., in the form of a flag) for nodal-segment IDs that indicates how to calculate the path identified by that nodal-segment ID (e.g., using shortest IGP metric, extended latency IGP metric, and the like). Information that identifies the path associated with the advertised ID in terms of a hop list or SR stack may also be included. In some embodiments, the sub-TLV may also include information identifying the domain to which the ID belongs (e.g., in systems that support SR across multiple domains) and/or that the ID is being linked (via redistribution) to another segment ID within a different domain (if the latter, the linked segment ID can also be included in the sub-TLV). (Performing SR across multiple domains is discussed in more detail below.) The sub-TLV can be part of a larger TLV (e.g., such as TLV22, TLV135, and the like) within the link state packet.

As an example, if IDs are 20 bits in length, each sub-TLV can include the 20-bit ID being advertised, following by a variable-length flag vector that can indicate the type of ID and other information. In one embodiment, the flag vector can include one or more of the following flags: a flag indicating whether the ID is unique within the local domain, a flag indicating that the path to the advertising node should be computed based upon a shortest-path IGP metric, a flag indicating that the path to the advertising node should be computed based upon an IGP extended latency metric, and the like. As described above, any of a variety of algorithms can be used to calculate a path to an SR node, and thus this sub-TLV can indicate the type of algorithm used to calculate the path associated with the advertised ID, thus ensuring that all SR nodes use that same algorithm when calculating that path.

This link state packet can be also be used to indicate whether the node sending the link state packet containing the sub-TLV supports SR. For example, the ability of the SR node to support SR can be indicated by a value in the router capability TLV 242 of an IS-IS link state packet.

Segment Routing (SR) enables segment-switched paths (SSPs), which can be used for transporting packets through the provider network. Like LSPs, SSPs are typically associated with FECs, and can be established for a variety of purposes, such as to guarantee a certain level of performance. Packets associated with the same FEC will typically follow the same SSP of SR nodes through the provider network. Nodes in SSPs make forwarding decisions based on segment IDs, not based on the contents (e.g., destination IP addresses) of packets. As such, packet forwarding in SSPs is not dependent on a particular Layer 2 technology.

SR nodes can use nodal-segment IDs, adjacency-segment IDs, and service-segment IDs they receive in advertisements from other SR nodes in order to create ordered lists of segment IDs (i.e., segment ID stacks). Segment ID stacks correspond to SSPs, respectively, that forward packets between nodes (e.g., SR enabled ingress and egress nodes) in the provider network. Segment IDs in a stack may correspond to respective segments or sub paths of a corresponding SSP. When an SR source node (e.g., an SR ingress PE node) receives a packet, the node can calculate a FEC for the packet in much the same way that LDP ingress PE nodes calculate FECs for packets received from a customer edge router. The SR source node uses the FEC it calculates to select a segment ID stack mapped thereto. The SR source node can add the selected segment ID stack to a header, and then attach the header to the packet. The packet with attached stack can traverse the segments of the SSP in an order that corresponds to the list order of the segment IDs in the stack. A forwarding engine operating in the dataplane of each SR node can use a segment ID within the stack and an SR forwarding table in order to forward the packet and header to the next node in the SSP. As the packet and attached header are forwarded along the SSP in a hop-by-hop fashion, the attached stack of segment IDs remains unchanged in one embodiment.

Figure 2A:
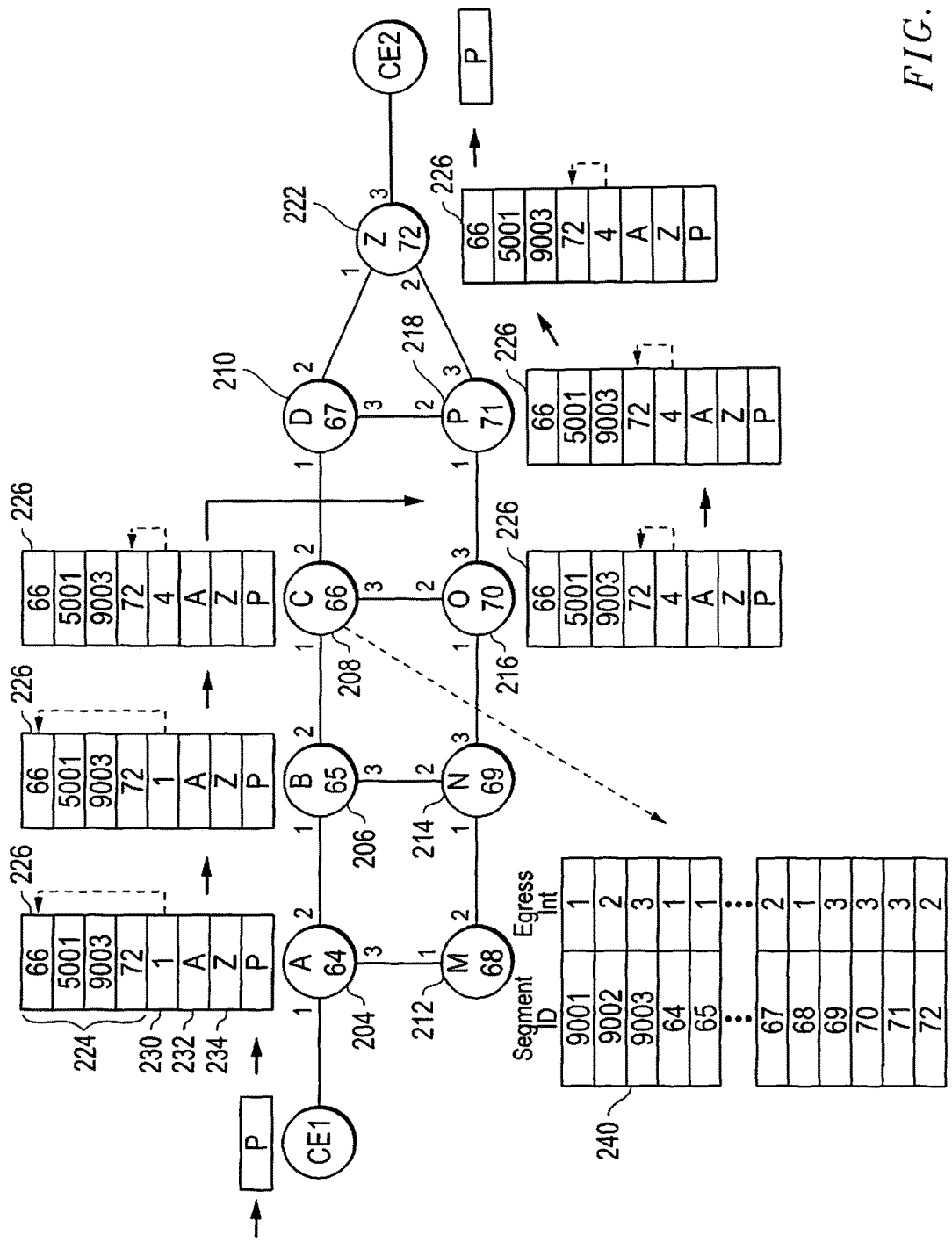
FIG. 2A is a block diagram illustrating an example network, according to another embodiment.

To illustrate general concepts of SR, FIG. 2A shows: a portion of an example SR enabled provider network 202 that is in data communication with customer edge routers CE1 and CE2; an example header 226 containing an example segment ID stack 224, and; an example SR forwarding table 240.

Provider network 202 consists of SR nodes 204-222. Nodes 204-210 are assigned unique nodal-segment IDs 64-67, respectively, SR enabled routers 212-218 are assigned unique nodal-segment ID's 68-71, respectively, and SR enabled router 222 is assigned unique nodal-segment ID of 72. Each of the SR nodes 204-222 have interfaces that are identified as shown. For example, node 204 has three interfaces designated 1-3, respectively. Each of the nodes 204-222 is assigned a node prefix that is unique within network 202. Node prefixes A-D are provided for nodes 204-210, respectively, node prefixes M-P are provided for nodes 212-218 respectively, and node prefix Z is provided for node 222. As noted above, these node prefixes are unique within network 202 and can be used for several purposes such as calculating the topology of network 202, which in turn can be used to calculate paths. Nodes 204-222 can also assign locally significant adjacency-segment IDs and/or service-segment IDs. For example, node 208 can assign adjacency-segment IDs 9001-9003 for adjacencies CB, CD, and CO, respectively, and node 208 can assign service-segment ID 5001 for a deep packet inspection service provided by the node.

Each of SR nodes 204-222 can advertise its service-segment ID, adjacency-segment ID(s), nodal-segment ID, and node prefix to the other nodes in network 202. For example, node 208 can generate and send one or more advertisements (e.g., using a sub-TLV of one or more IS-IS link state packets as described above) that: map adjacency-segment IDs 9001-9003 to adjacency IDs CB, CD, and CO, respectively; map nodal-segment ID 66 to node prefix C, and; map service-segment ID 5001 to a deep packet inspection service. Using the advertisements they receive, the control planes of nodes 204-222 can generate respective SR forwarding tables for use in the dataplanes. For example, node 208 can generate example SR forwarding table 240 using a link state protocol and the advertisements that node 208 receives directly or indirectly from nodes 204, 206, 210, 212-218, and 222. Example SR forwarding table 240 maps adjacency-segment IDs 9001-9003 to node interface IDs 1-3, respectively, and nodal-segment IDs such as 64, 65, 67, 70, and 72, to node 208 interface identifiers 1, 1, 2, 3, and 2, respectively, which are the egress interface identifiers determined by node 208 for node prefixes A, B, D, 0, and Z respectively. It is noted that in the embodiment shown, only SR forwarding table 240 maps adjacency-segment IDs 9001-9003 to interface identifiers; SR forwarding tables in the other nodes of network 202 should not map adjacency-segment IDs 9001-9003.

In addition to creating SR forwarding tables based on received segment ID advertisements, several SR nodes 204-222 can calculate segment ID stacks for respective SSPs. For example, node 204 calculates example segment ID stack 224 for an SSP between ingress node 204 and egress node 222. Example segment stack 224 can be calculated for a particular FEC (e.g., FEC F).

Example stack 224 includes four segment IDs: nodal-segment IDs 66 and 72 advertised by nodes 208 and 222, respectively; service-segment ID 5001 advertised by node 208, and; adjacency-segment ID 9003 advertised by node 208. Stack 224 corresponds to an SSP in which packets flow in order through nodes 204, 206, 208, 216, 218, and 222. Packets flowing through this SSP are also subjected to the deep packet inspection service provided by node 208.

SR node 204 is an ingress PE node for packets received from customer edge router CE1. In response to receiving a packet, ingress SR node 204 can calculate a FEC based upon, for example, one or more IP addresses contained within the packet. After calculating the FEC for the packet, node 204 can select a segment ID stack, which is mapped to the calculated FEC from a table stored in memory (not shown). For example, node 204 can calculate FEC F for packet P based on the destination IP address in packet P. As noted above, FEC F is mapped to example stack 224. Node 204 may then create a header such as header 226 for packet P that contains the selected segment ID stack 224. Example header 226, as shown in FIG. 2A, also includes an active segment ID pointer 230. The active segment ID pointer points to or identifies a segment ID (hereafter the active segment ID) in the stack that an SR node should consider when the node receives the packet and attached header. When the header is first created the active segment ID pointer 230 should be set to 1, thereby pointing to the first segment ID of the stack. In some embodiments, a header may include identifications (e.g., respective nodal-segment IDs or node prefixes) of the source and destination (e.g., ingress and egress nodes) for the associated SSP. In FIG. 2A, nodal-segment IDs are used for source identification 232 and destination identification 234 in example header 226. Additional information such as TTL may be included in headers.

Example segment stack 224 lists segment IDs that correspond to one hop and multi hop segments of provider network 202 that packets with stack 224 traverse to reach egress node 222. The segments collectively form the SSP corresponding to stack 224. Once header 226 is attached to packet P, ingress SR enable node 204 may access a SR forwarding table (not shown) using the active segment ID of the segment ID stack 224. Again, the active segment ID is identified by the active segment ID pointer 230. In the embodiment shown in FIG. 2A, active segment ID pointer is set to 1 at ingress SR node 204. Accordingly, the active segment ID within header 226 is nodal-segment ID 66. SR node 204 accesses its SR forwarding table using nodal-segment ID 66 to read egress interface identifier 2 mapped, which is the egress interface for the path to the SR node that is assigned nodal-segment ID 66.

Figure 3A:
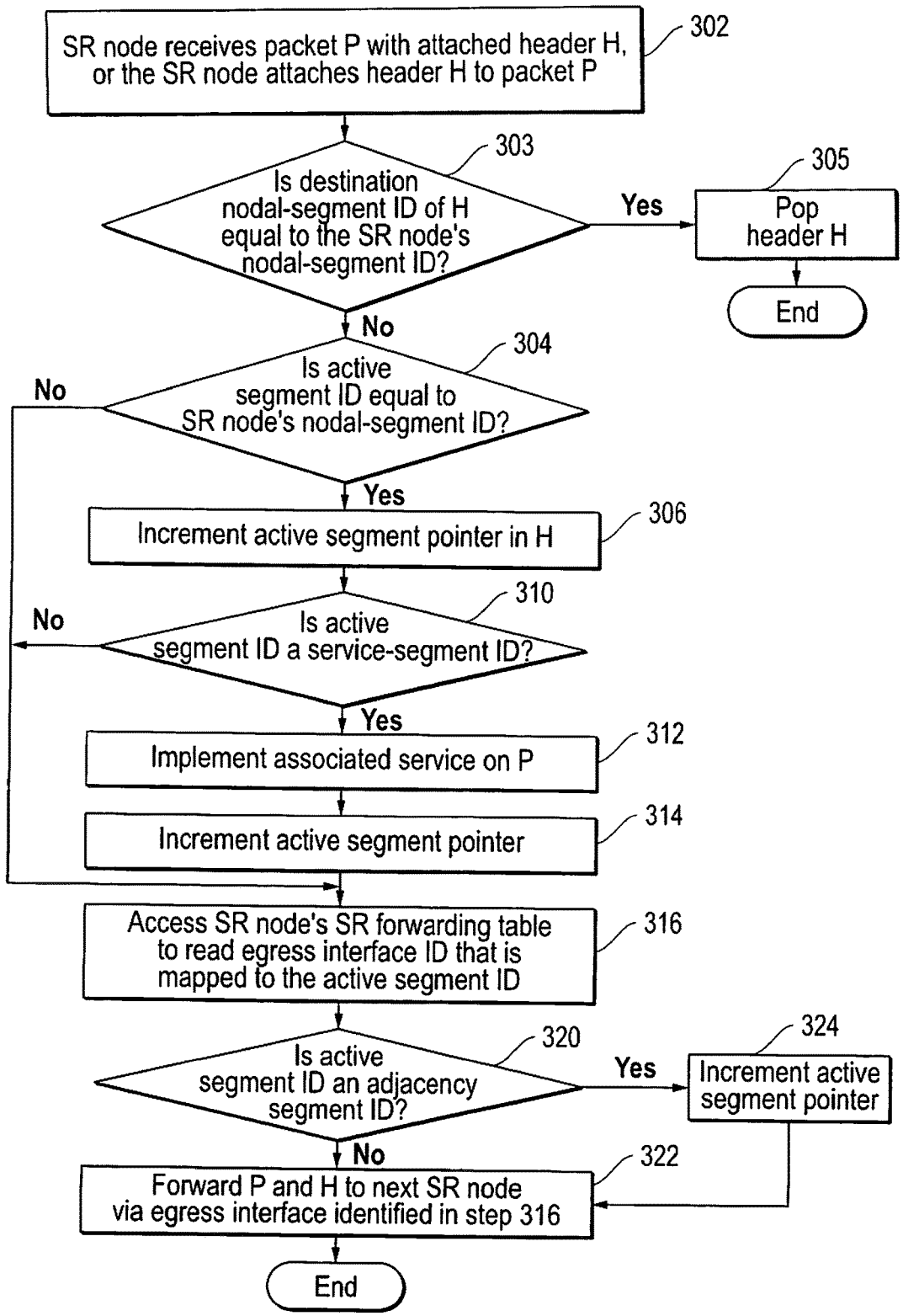
FIG. 3A is a flow chart illustrating an example process employed by a node of FIG. 2A in one embodiment.

With continuing reference to FIG. 2A, FIG. 3A illustrates example aspects of packet forwarding using SR according to one embodiment. More particularly, FIG. 3A illustrates an example method performed by an SR node in a provider network like that shown in FIG. 2A in response to receiving a packet with an attached header H, or in response to attaching a header H to a packet. The first step in the method is a determination of whether the SR node is the destination node of the SSP. There are many ways this can be implemented. For example, if the active segment ID pointer cannot be incremented because the active segment ID is the last segment ID in the stack, the SR node is the destination. In the embodiment shown if the destination nodal-segment ID in header H equals the SR node's nodal-segment ID, the SR node is the destination, and the SR node detaches header H before forwarding the packet using, for example, IP routing. Otherwise, the SR node proceeds to determine the active segment ID in the segment ID stack. More particularly, the SR node reads the active segment ID pointer to identify the active segment ID of the segment ID stack. The SR node then determines whether the active segment ID is equal to the nodal-segment ID assigned to the SR node. Step 304 can be performed by the SR node by comparing the active segment ID with the nodal-segment ID assigned to the SR node. If the SR node determines that the active segment ID is the node's nodal-segment ID, the process proceeds to step 306 where the SR node increments the active segment ID pointer, which in turn identifies the next or new active segment ID.

After the SR node increments the active segment pointer in step 306, the SR node determines whether the active segment ID is a service-segment ID for a service to be performed by the SR node. This step can be implemented simply by comparing the active segment ID with a service-segment ID mapped to a service in memory of the SR node, or by comparing the active segment ID with a range of IDs that are reserved for service-segment IDs. If the SR node determines in step 310 that the active segment ID is a service-segment ID, then the process proceeds to step 312 where the SR node implements the offered service on packet P. Thereafter, in step 314 the SR node increments the active segment ID pointer, which in turn identifies the next or the new active segment ID in the segment ID stack.

Presuming the active segment ID does not equal the SR node's nodal-segment ID in step 304, or the active segment ID is not a service-segment ID as determined in step 310, the process proceeds to step 316 where the SR node accesses its SR forwarding table to read the egress interface ID that is mapped to the active segment ID. In step 320 the SR node determines whether the active segment ID is an adjacency-segment ID or a nodal-segment ID. This determination may be implemented by simply comparing the active segment ID with the designated range of nodal-segment IDs that are available for assignment within the network. Thus, if the active segment ID is found to be a number within the designated range, the active segment ID is a nodal-segment ID and the SR node forwards packet P and attached header H to the next node via the egress interface that is identified in step 316. Otherwise, the active segment ID is an adjacency-segment ID, and the active segment pointer 324 is incremented before packet P and header H are forwarded to the next node via the egress interface that is identified in step 316.

It is noted that in an alternative embodiment, an active segment ID pointer is not needed. In this alternative embodiment, the segment ID at the top of the stack is considered the active segment ID, and segment IDs can be popped from the segment ID stack at steps 306, 314 or 324 instead of incrementing a pointer in the header as shown. In this alternative embodiment, however, the stack changes substantially as the packet and header traverse the SSP.

With continuing reference to FIG. 3A, FIG. 2A shows packet P and the state of active segment pointer 230 as packet P and header H are forwarded by nodes of the SSP corresponding to segment stack 224. As shown, pointer 230 does not change as nodes 204 and 206 forward packet P and header 226. However, the active segment pointer 230 is incremented twice at node 208 in accordance with steps 306 and 314 respectively. Nodes 216 and 218 forward packet P and header 226 without incrementing active segment pointer 230. SR egress PE node 222 recognizes the destination nodal-segment ID as its own nodal-segment ID, and as a result node 222 detaches header 226 from packet P in accordance with step 305. Eventually, node 222 may employ traditional IP routing and forward packet P to CE2 based on a routing table lookup using the destination IP address within packet P.

FIG. 3A illustrates an example method employed by SR nodes when forwarding a packet P with attached header H using, for example, the SR forwarding table 240 shown within FIG. 2A. Other SR forwarding methods are contemplated. For example, one alternative method for forwarding packets in SR nodes employs a slightly different SR forwarding table. In this alternative embodiment, a stack instruction can be added to the SR node forwarding table. This stack instruction, when implemented can change the active segment pointer within header H without having to go through a comparatively complex method like that shown within FIG. 3A. FIG. 2B illustrates an example SR forwarding table that includes stack instructions mapped to segment IDs. In one embodiment, the stack instructions are limited to increment (Inc.), which instructs the SR node to increment the active segment pointer, and continue (Cont.), which instructs the SR node to leave the active segment pointer ID as is. Other stack instructions are contemplated. In contrast to the SR forwarding table 240 shown in FIG. 2A, the SR forwarding table 241 shown in FIG. 2B may include service-segment IDs, and the nodal-segment ID for the SR node that contains the table. To illustrate, the SR forwarding table 241 shown in FIG. 2B illustrates an example of the alternative that can be employed in node 208 shown within FIG. 2A. As can be seen in FIG. 2B, example table 241 includes nodal-segment ID 66, which is assigned to SR node 208, and service-segment ID 5001, which corresponds to the deep packet inspection service provided by node 208. These segment IDs, however, are not mapped to egress interface identifiers in SR forwarding table 241. Rather, nodal-segment ID 66 and service-segment ID 5001 are mapped to null.

Figure 3B:
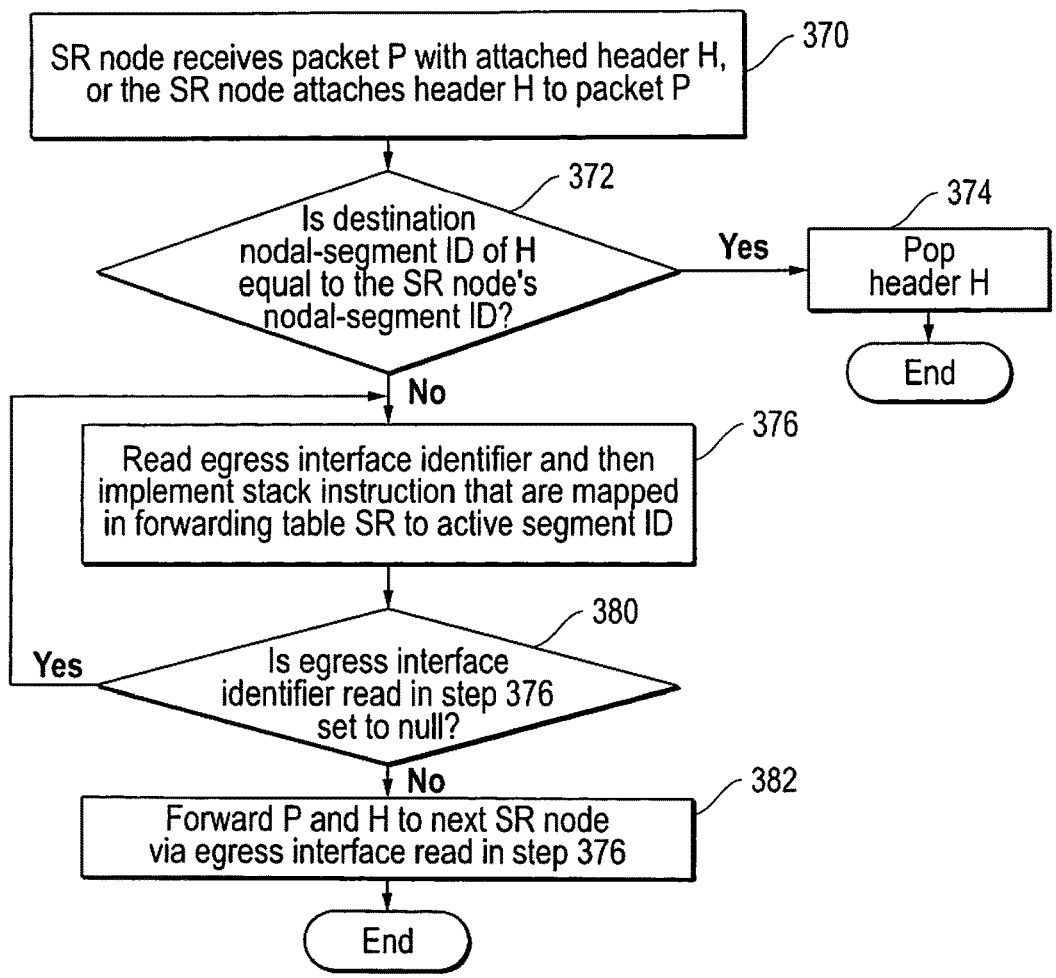
FIG. 3B is a flow chart illustrating an example process employed by a node of FIG. 2A in one embodiment.

With continuing reference to FIGS. 2A, 2B, FIG. 3B illustrates an alternative method that can be employed by an SR node in FIG. 2A using the alternative SR forwarding table such as that shown within FIG. 2B. The process in FIG. 3B starts when an SR node receives a packet P with attached header H such as header 226 shown within FIG. 2A, or when the SR node attaches header H to packet P. The SR node determines whether the destination-nodal segment ID 234 within H is equal to the SR node's nodal-segment ID. If these two nodal segment IDs are equal in step 372, the packet has reached the last SR node in the SSP, and as a result the SR node pops header H before forwarding packet P to, for example, customer edge router such as CE2. However, if the destination nodal-segment ID does not equal the SR node's nodal-segment ID, the process proceeds to step 376 where the SR node reads the egress interface identifier mapped to the active segment ID within the SR forwarding table. Then the SR node implements the stack instruction that is mapped to the active segment ID. Again, in this embodiment, the stack instruction, which is implemented by the forwarding engine in one embodiment, increments the active segment pointer if the mapped instruction is set to increment, or does not increment the active segment pointer if the mapped instruction is set to continue. In step 380, the SR node determines whether the egress interface identifier that was read in step 376 is set to null. Again, an egress interface identifier is set to null when it is mapped to the SR node's nodal-segment ID or when the egress interface identifier is mapped to the SR node's service-segment ID. It is noted that, although not shown within FIG. 3B, the SR node will implement the service associated with the service-segment ID prior to implementing the stack instruction mapped to the service-segment ID within the SR forwarding table. At any rate, if the egress interface identifier read in step 376 is set to null, the SR node repeats step 376. Otherwise, the SR node forwards packet P and attached header H to the next SR node via the egress interface that was read in step 376 as shown in step 382.

When creating a segment stack to include in a header of packet to be routed via a network of SR nodes, an SR node can use any of the segments identified in its SR forwarding table. As described above, these segments can identify paths calculated using any of a variety of different algorithms, such that a given segment stack can identify segments calculated using different algorithms. For example, a segment stack listing segment IDs A, B, D, E, F can include two paths (e.g., those identified by segment IDs A and B) calculated using a first algorithm and another path (e.g., identified by segment ID E) calculated using an entirely different algorithm.

Segment stacks can be constructed in any manner needed for traffic engineering purposes. Additionally, a node can use any of the identified segments in its SR forwarding table to form a segment stack. Furthermore, a node may select bits and pieces of paths identified by different segments in order to create a segment stack. Thus, a node can combine different segments into a segment stack for a variety of reasons. One reason is to define a new path that is not explicitly defined by any existing segment. Thus, to get a packet from node A to node F, a segment stack created by node A can include one segment that goes to node B, and another segment that includes node B (but doesn't necessarily have to start with node B) and goes to node F. As noted above, these two segments can cover paths calculated using different algorithms.

Another reason for combining different segments is in order to reduce the number of segment identifiers in the stack. For example, a node can determine that a packet should be routed over a path that passes through six nodes ABCDEF in that exact order. While the node could use six adjacency segments to route the packet, the segment stack would need to include all six identifiers of those adjacency segments. As an alternative, the SR node can examine its forwarding table and determine that the nodal-segment to node C includes nodes A and B, and that the nodal-segment to node F includes nodes D and E. Based on these determinations, the SR node can simply include the nodal-segment to C followed by the nodal-segment to F in the segment stack, reducing the number of identifiers from six to two.

As briefly noted above, some embodiments may support SR over multiple domains (e.g., as defined by an administrator or a protocol). In these embodiments, certain SR nodes may operate in multiple domains simultaneously. As an example, in FIG. 4, there are two domains, D1 and D2, that each include several nodes. Domain D1 includes nodes A, B, and C, while domain D2 includes nodes C, D, and E. All of nodes A-E perform SR. As shown, node C includes at least one interface in domain D1 and at least one interface in domain D2.

While nodes within a given domain can be guaranteed to use unique nodal-segment IDs for each nodal-segment defined within the domain, this guarantee of uniqueness does not extend across domains. As such, SR nodes cannot simply advertise the same nodal-segment IDs they use within their own domain into another domain. Accordingly, nodes A and B cannot advertise their nodal-segment IDs into domain D2, and nodes D and E cannot advertise their nodal-segment IDs into domain D1.

Figure 4:
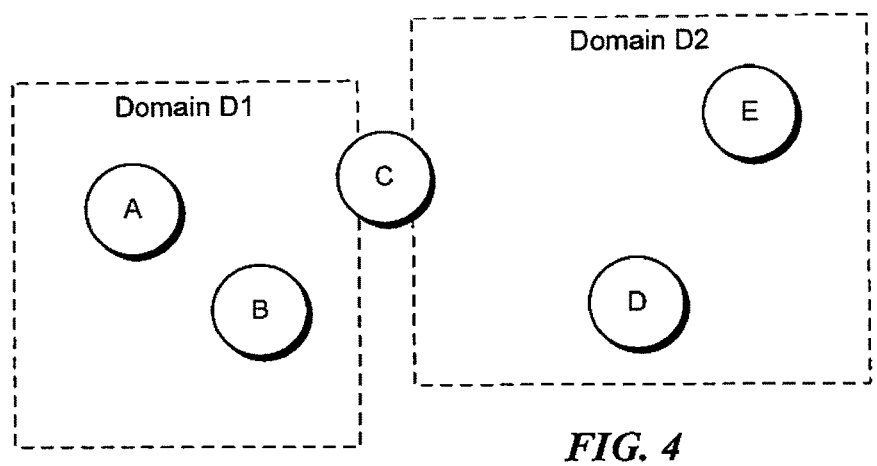
FIG. 4 is a block diagram illustrating how SR can be performed across multiple domains, according to one embodiment.

In order to allow SR to be performed across domains D1 and D2, a node that bridges domains, like node C in FIG. 4, can be configured to redistribute segment IDs from one domain to another. Redistribution is performed using a special advertisement in which a segment ID from the original domain is linked with a nodal-segment ID of the node that is redistributing the ID into another domain. Here, node C can redistribute segment IDs from domain D2 into domain D1 by associating the segment IDs from domain D2 with nodal-segment IDs for node C in domain D1. For example, node C can receive a link state packet in domain D2 from node E, advertising that node E can be reached via a particular nodal segment. Node C can then obtain a new domain D1 nodal-segment ID (for a path in domain D1 to node C) and redistribute the domain D2 nodal-segment ID by sending a link state packet that indicates that the domain D2 nodal segment ID is being redistributed and is now linked to the new domain D1 nodal-segment ID. For example, if node E advertises that its nodal-segment ID is 22, node C can redistribute that ID by obtaining a new domain D1 nodal-segment ID 33 for itself (e.g., by requesting such an ID from a PCE router) and the sending a link state packet identifying nodal-segment ID 22 as being a redistributed ID from D2 that is being linked with ID 33 in D1.

When a node receives a link state message that indicates that a segment ID has been redistributed, the node updates its SR forwarding table to include both the original segment ID (from the other domain) and the linked segment ID (from the same domain as the receiving node). When forming segment stacks involving this path, the node will include both IDs in the segment stack. The topmost ID, which is the segment ID in the same domain as the node forming the segment stack, will cause the packet to which the segment stack is attached to be routed to the node that performed the redistribution. The next ID, which is the segment ID that was redistributed, is then used to route the packet from the node that performed the redistribution into the foreign domain.

Since a network can contain more than two domains, there can be multiple layers of redistribution. When this occurs, the number of linked segment IDs will equal the number of domains to which the original segment ID has been redistributed. Thus, if a redistributed segment ID was redistributed from the second domain to a third domain, there would be three segment IDs in the advertisement: one for each domain into which the segment ID had been advertised.

When segment IDs are redistributed, the properties associated with the original segment ID are preserved. Thus, if the original segment ID is advertised in a manner indicating that the segment ID represents a path calculated using a particular algorithm, this property will be maintained in the advertisements used to redistribute the segment ID. Accordingly, in the above example, the new segment ID requested by the node performing the redistribution will be associated with the same properties as the segment ID to which it is linked. In other words, both the original path in the original domain and the new, linked path in the foreign domain will be calculated using the same algorithm.

If multiple nodal-segment IDs to the same node are redistributed into another domain, each will be linked with a unique nodal-segment ID in the foreign domain. The linked segment will be calculated using the same algorithm as the original segment.

A Segment-Routed Fabric for Virtualized Dynamic Traffic-Engineered Flow

Networks MPLS Traffic Engineering (MPLS-TE) is a technique to engineer a demand matrix on a given infrastructure. However, MPLS-TE cannot support extremely fast and granular optimization, nor is MPLS-TE designed to account for multiple independent demand-matrices overlaid on the same infrastructure.

As a numerical example, assume a network of 1000 edge router (PE) and 100 core router (P) devices and a single demand from any PE to any PE (the least granularity possible, hence the simplest case). This represents 1000× 1000=one (1) million Label Switched Paths (LSPs) to install through the network. Assume, on average, the number of hops of a PE-to-PE LSP is five (5) (four (4) P devices on the path). The paths are distributed uniformly across all the P devices.

In this example, each LSP is worth four (4) P states in the network. With one million LSPs, this makes four million LSP states. Assuming uniform distribution, this represents four million/100=40,000 LSP states per node. Each PE node would have 999 LSP states, and each P node would have 40,000 LSP states. As this example shows, such a network would likely have scaling and performance problems. In fact, today even smaller deployments (150×150) may suffer from scaling and performance problems.

In Software Defined Networking (SDN), applications will be able to request service-level agreement (SLA) commitments for much finer (more granular) demands. Assuming a modest granularity increase of 10 demands per PE to PE pair instead of one, as in the prior example, the number of LSP states per PE and P would become 9990 and four (4) million respectively.

Assuming that 20% of these demands change every 15 minutes, this leads to approximately 2000/800,000 LSP state changes per PE/P every 15 minutes or 200,000/80 million LSP state changes per PE/P per day. This result scales neither from an absolute state count perspective (four million far exceeds the one million MPLS label space currently available) nor from a dynamic LSP state change count perspective.

With MPLS-TE, the diameter of the engineered network may need to be restricted (100 P to 100 P nodes instead of 1000 PE to 1000 PE nodes); to be configured so that the network deals with less granular, less variant demands; and to be configured so that the network inhibits opening, on a per application demand basis, new paths through network, but instead maps each of these individual demands onto a small number of possible paths between the MPLS-TE endpoints.

In one embodiment, a solution allows use of any path through the network on a per SDN application demand basis, whatever the number of demands and their frequency of change. In the description that follows, a chain-routed network infrastructure (or at least one capable of supporting chain-routing of packets) is assumed, as well as the existence of an entity that acts as a Path Computation Element (PCE) server. This entity is responsible for maintaining an up-to-date view of the global network state.

In simple terms, achieving the desired application-specific traffic engineering relies on two elements: the PCE server, which maintains a complete view of the state of the network and of all traffic-engineering bandwidth reservations; and the chain-routed network layer, which allows an ingress edge router to direct each incoming packet along any available path to the egress edge router.

There are several alternatives for how an application can request and manage bandwidth resources from the fabric. In one embodiment, an application issues a new type of PCE request to inquire about the feasibility of a specific SLA between two end-points of the network (PE1 to PE2, SLA1). If the PCE server finds a path that meets the SLA request SLA1 (in terms of bandwidth, SRLG avoidance, disjointness with another demand, latency, loss bounds, and the like), the PCE server replies to the application and provides the chain-routed label stack to impose on the packets for this demand.

Alternatively, the application can register with the PCE server and reserve a certain amount of bandwidth per link, for each link in the topology. The application receives a topology map of the network together with all the existing chains. The application can then itself keep the "books" for how its bandwidth is used on a per link basis and how its demands are routed through the network. An important consideration in this description is that the service provider has control over the view of the network topology that is provided to the application. The service provider may choose, on a per-application basis, whether to provide a picture of the full network topology, or instead to provide a restricted or otherwise edited topology view to the application.

Furthermore, all of the techniques that apply to applications above can also be applied to customer edge (CE) devices. In these cases, information can be exchanged with the CE device using a User-to-Network Interface (UNI) protocol designed for the purpose, rather than via PCE. This yields an attractive alternative to the "classic" MPLS VPN service model. The same fabric architecture thus allows us to support highly dynamic traffic-engineered virtual overlay networks both for "classic" VPNs, and for "modern" SDN-style applications, and in such a way that the service provider has complete control over the visibility and usage of the fabric topology.

Finally, although the above description used an example in which the PCE was the means by which applications communicate with the network fabric, this is not essential. Alternative protocols or APIs can be used if desired to pass requests and information between applications or customer edge devices and the network fabric.

Any path through a network can be encoded as a combination of chains. Hence, in either of the two cases above, the network does not need to track a path state per demand. Assuming 3 nodal chains per node and 15 adj chains per node, each node would need to store an absolute number of 1100×3+15=3315 chain states. This is 1000 times smaller than what MPLS-TE would require (4M).

From a dynamic state fluctuation perspective, as chains do not reflect demands, there is no state modification on the P nodes as opposed to 800 k per P node in the MPLS-TE case. The trick is that each demand, while being associated with a specific path, does not require a specific LSP path state through the network. Instead, each specific path is built from the combination of a small number of stable chains. The chains act as an intermediate step between the demands and the network. The chains do not limit the extent of the paths that can be expressed (any path can be encoded as a combination of chain), but the use of chains does limit the number of states that need to be supported by any node in the network.

As explained in the previous example, the basic chains supported by the infrastructure allow for any virtual overlay to build any path through the network. All that is required is have a share of any link and the knowledge of the topology and chains. The PCE server (or equivalent functional component) acts as a clearinghouse for the various overlay networks and their demands, ensuring that an arbitrary number of distinct applications or "virtual" network topologies map cleanly onto the same underlying fabric.

A new traffic engineering method can support virtualized network or application overlays. Any granular demand can be routed along any path through the network with a very modest number of absolute path states per node (<10 k), which do not depend on the virtualized overlay entity nor on the engineered demand. In many embodiments, there is no restriction on the frequency with which demands and traffic-engineered overlay topologies can be updated.

The service provider can provide a customized picture of the fabric topology and resources to each user device or application, thereby retaining complete control over what the user device or application can see or do with the fabric. (This model is in stark contrast to other SDN models popular today, such as those based on OpenFlow, in which SDN applications are allowed to see and meddle directly with network infrastructure elements.)

PCE extension can provide a chain stack as a reply. A BGP-LS extension can communicate the chains within a topology to 3rd party application. A PCE extension can request the reservation of a bandwidth share per link. A PCE extension can request the reservation of a bandwidth share per link for any link in the topology Thus, a traffic engineering technique can be established that allows for any granular demand to be routed along any path through the network with a very modest number of absolute path states per node (<10 k) and no per-demand state modification. A virtualization of the traffic engineering solution can be provided that allows any virtual network or application overlay to build any path through the network without requiring an individual per-path state through the infrastructure, and that allows the service provider to retain control of the view of the network topology and resources that is presented to applications and customer devices.

Example Node

Figure 5:
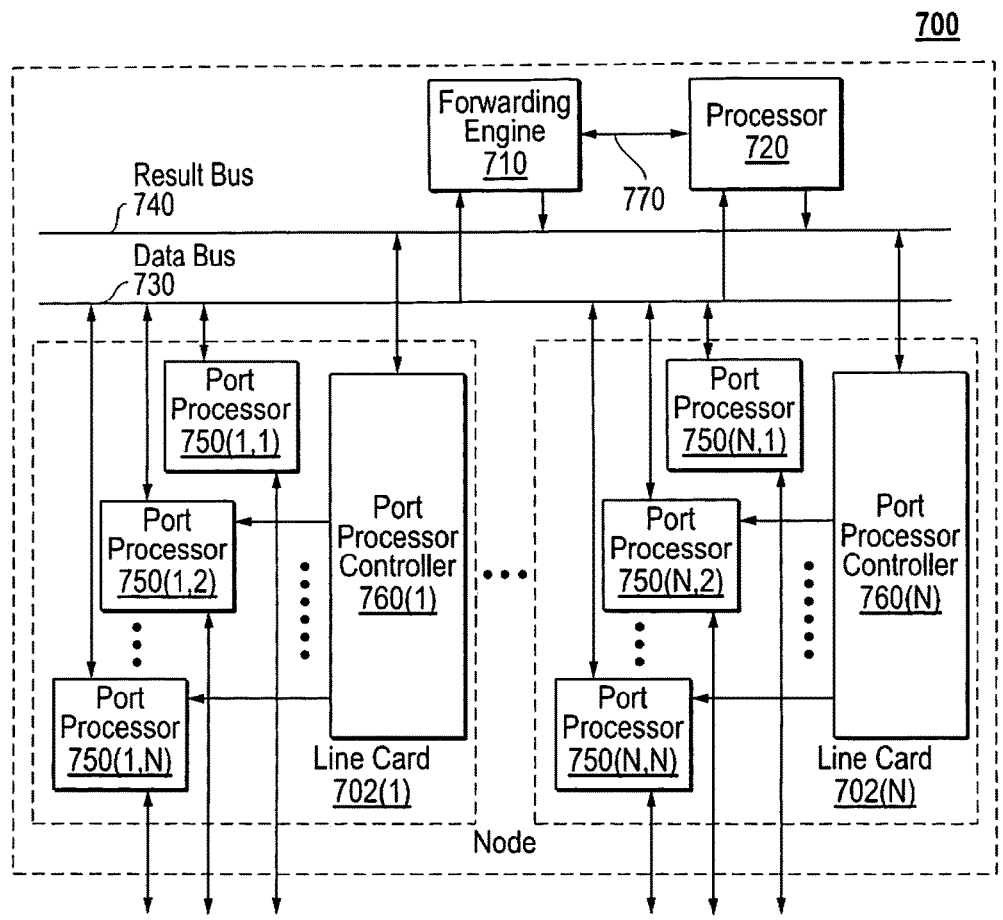
FIG. 5 is a block diagram illustrating certain components of an example node that can be employed in the network of FIG. 1, 2A, or 4 in one embodiment.

FIG. 5 is a block diagram illustrating certain additional and/or alternative components of nodes that can be employed in the networks shown in FIGS. 1, 2A, and 4. In this depiction, node 700 includes a number of line cards (line cards 702(1)-(N)) that are communicatively coupled to a forwarding engine or packet forwarder 710 and a processor 720 via a data bus 730 and a result bus 740. Line cards 702(1)-(N) include a number of port processors 750(1,1)-(N,N) which are controlled by port processor controllers 760(1)-(N). It will also be noted that forwarding engine 710 and processor 720 are not only coupled to one another via data bus 730 and result bus 740, but are also communicatively coupled to one another by a communications link 770.

The processors 750 and 760 of each line card 702 may be mounted on a single printed circuit board. When a packet or packet and header are received, the packet or packet and header may be identified and analyzed by router 700 in the following manner. Upon receipt, a packet (or some or all of its control information) or packet and header is sent from the one of port processors 750(1,1)-(N,N) at which the packet or packet and header was received to one or more of those devices coupled to data bus 730 (e.g., others of port processors 650(1,1)-(N,N), forwarding engine 710 and/or processor 720). Handling of the packet or packet and header can be determined, for example, by forwarding engine 710. For example, forwarding engine 710 may determine that the packet or packet and header should be forwarded to one or more of port processors 750(1,1)-(N,N). This can be accomplished by indicating to corresponding one(s) of port processor controllers 760(1)-(N) that the copy of the packet or packet and header held in the given one(s) of port processors 750(1,1)-(N,N) should be forwarded to the appropriate one of port processors 750(1,1)-(N,N). In addition, or alternatively, once a packet or packet and header has been identified for processing, forwarding engine 710, processor 720 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   receiving a first packet at a first node, wherein
      the first packet comprises a segment stack,
      the segment stack comprises a plurality of segment identifiers (IDs) that define a segment-switched path across a provider network,
      a first segment ID of the plurality of segment IDs is an adjacency segment ID, wherein
         the adjacency segment ID identifies a first segment that is a first sub-path of the segment-switched path, and
         the first segment is an adjacency segment linking two adjacent nodes, and
      a second segment ID of the plurality of segment IDs is a nodal segment ID, wherein
         the nodal segment ID identifies a second segment that is a second sub-path of the segment-switched path, and
         the second segment is a nodal segment comprising a plurality of hops within the provider network;
   analyzing the segment stack to determine a segment type identified by an active segment ID in the segment stack;
   in response to determining that the segment type identified by the active segment ID is that of the adjacency segment, sending the first packet to an adjacent node as identified by the adjacency segment ID; and
   in response to determining that the segment type identified by the active segment ID is that of the nodal segment, sending the first packet to a non-adjacent node via the nodal segment.

2. The method of claim 1, further comprising:
   removing the active segment ID from the segment stack, thereby creating a new active segment ID.

3. The method of claim 2, further comprising:
   receiving the first packet at a second node, and
   in response to receiving the first packet at the second node, analyzing the segment stack to determine a segment type identified by the new active segment ID in the segment stack.

4. The method of claim 3, further comprising:
   prior to sending the first packet to a third node, determining a next node to send the first packet to, wherein the nodal segment comprises the next node.

5. The method of claim 4, wherein
   the nodal segment is selected from at least a first nodal segment and a second nodal segment, wherein
      each of the first nodal segment and the second nodal segment can be used to reach the next node.

6. A network device comprising:
   one or more network interface cards;
   a memory storing a segment routing (SR) forwarding table; and
   a processor configured to a method comprising:
      receiving a first packet at a first node, wherein
         the first packet comprises a segment stack,
         the segment stack comprises a plurality of segment identifiers (IDs) that define a segment-switched path across a provider network,
         a first segment ID of the plurality of segment IDs is an adjacency segment ID, wherein
            the adjacency segment ID identifies a first segment that is a first sub-path of the segment-switched path, and
            the first segment is an adjacency segment linking two adjacent nodes, and
         a second segment ID of the plurality of segment IDs is a nodal segment ID,
         wherein
            the nodal segment ID identifies a second segment that is a second sub-path of the segment-switched path, and
            the second segment is a nodal segment comprising a plurality of hops within the provider network;
      analyzing the segment stack to determine a segment type identified by an active segment ID in the segment stack;
      in response to determining that the segment type identified by the active segment ID is that of the adjacency segment, sending the first packet to an adjacent node as identified by the adjacency segment ID; and
      in response to determining that the segment type identified by the active segment ID is that of the nodal segment, sending the first packet to a non-adjacent node via the nodal segment.

7. The network device of claim 6, wherein the method further comprises:

removing the active segment ID from the segment stack, thereby creating a new active segment ID.

8. The network device of claim 7, wherein the method further comprises:
   receiving the first packet at a second node, and
   in response to receiving the first packet at the second node, analyzing the segment stack to determine a segment type identified by the new active segment ID in the segment stack.

9. The network device of claim 8, wherein the method further comprises:
   prior to sending the first packet to a third node, determining a next node to send the first packet to, wherein
      the nodal segment comprises the next node.

10. The network device of claim 9, wherein
    the nodal segment is selected from at least a first nodal segment and a second nodal segment, wherein
      each of the first nodal segment and the second nodal segment can be used to reach the next node.

11. A system comprising:
    a first node configured to receive a first packet at a first node, wherein
      the first packet comprises a segment stack,
      the segment stack comprises a plurality of segment identifiers (IDs) that define a segment-switched path across a provider network,
      a first segment ID of the plurality of segment IDs is an adjacency segment ID, wherein
        the adjacency segment ID identifies a first segment that is a first sub-path of the segment-switched path, and
        the first segment is an adjacency segment linking two adjacent nodes, and
      a second segment ID of the plurality of segment IDs is a nodal segment ID, wherein
        the nodal segment ID identifies a second segment that is a second sub-path of the segment-switched path, and
        the second segment is a nodal segment comprising a plurality of hops within the provider network; and
    a forwarding module configured to:
      analyze the segment stack to determine a segment type identified by an active segment ID in the segment stack, and
      in response to determining that the segment type identified by the active segment ID is that of the adjacency segment, send the first packet to an adjacent node as identified by the adjacency segment ID, and
      in response to determining that the segment type identified by the active segment ID is that of the nodal segment, sending the first packet to a non-adjacent node via the nodal segment.

12. The system of claim 11, wherein the forwarding module is further configured to:
    removing the active segment ID from the segment stack, thereby creating a new active segment ID.

13. The system of claim 12, further comprising:
    a second node configured to
      receive the first packet, and
      in response to receiving the first packet, analyze the segment stack to determine a segment type identified by the new active segment ID in the segment stack.

14. The system of claim 13, wherein the second node is further configured to:
    prior to sending the first packet to a third node, determine a next node to send the first packet to, wherein
      the nodal segment comprises the next node.

* * * * *